United States Patent
Prucka et al.

(10) Patent No.: US 12,304,485 B2
(45) Date of Patent: *May 20, 2025

(54) VEHICLE LAUNCH CONTROL SEQUENCING

(71) Applicant: FCA US LLC, Auburn Hills, MI (US)

(72) Inventors: Michael J Prucka, Ann Arbor, MI (US); Christopher E Pueppke, Clarkston, MI (US); Jeremy J Anker, Lake Orion, MI (US); James M Wilder, Farmington Hills, MI (US); Yi Cheng, Ann Arbor, MI (US); Sean R King, Macomb, MI (US)

(73) Assignee: FCA US LLC, Auburn Hills, MI (US)

( * ) Notice: Subject to any disclaimer, the term of this patent is extended or adjusted under 35 U.S.C. 154(b) by 146 days.

This patent is subject to a terminal disclaimer.

(21) Appl. No.: 18/159,785

(22) Filed: Jan. 26, 2023

(65) Prior Publication Data

US 2024/0253633 A1 Aug. 1, 2024

(51) Int. Cl.
*B60W 30/18* (2012.01)
*B60W 10/04* (2006.01)
*B60W 10/196* (2012.01)

(52) U.S. Cl.
CPC ...... *B60W 30/18027* (2013.01); *B60W 10/04* (2013.01); *B60W 10/196* (2013.01); *B60W 2540/10* (2013.01); *B60W 2540/12* (2013.01); *B60W 2540/16* (2013.01); *B60W 2710/0644* (2013.01); *B60W 2710/0672* (2013.01); *B60W 2710/085* (2013.01)

(58) Field of Classification Search
CPC ........... B60W 30/18027; B60W 10/04; B60W 10/196; B60W 2540/10; B60W 2540/12; B60W 2540/16; B60W 2710/0644; B60W 2710/0672; B60W 2710/085; B60W 50/082
USPC .............................................. 701/1
See application file for complete search history.

(56) References Cited

U.S. PATENT DOCUMENTS

| | | |
|---|---|---|
| 8,175,785 B2 | 5/2012 | Turski et al. |
| 9,340,200 B2 | 5/2016 | Dufford |
| 9,731,721 B1 | 8/2017 | Wilder et al. |
| 9,855,813 B2 | 1/2018 | Mohamed |
| 9,873,431 B2 | 1/2018 | Sowards et al. |

(Continued)

*Primary Examiner* — Tyler D Paige
(74) *Attorney, Agent, or Firm* — Jeremy J. Klobucar

(57) ABSTRACT

A vehicle launch control technique includes obtaining a desired launch torque curve and a desired launch speed, performing a pre-staging procedure including generating a torque reserve for a powertrain, in response to paddle shifters being a first configuration and accelerator and brake pedals being fully depressed and then controlling vehicle positioning/movement in response to driver manipulation of the brake pedal, performing a staging procedure including (a) increasing the torque reserve, (b) activating a trans brake feature to hold the vehicle stationary, and (c) increasing a speed of the powertrain to the desired launch speed, in response to (i) the paddle shifters in a different second configuration and (ii) fully releasing the brake pedal, and after the staging procedure and in response to the paddle shifters being in a different third configuration, executing a vehicle launch procedure by depleting the torque reserve according to the desired launch torque curve.

14 Claims, 6 Drawing Sheets

(56) References Cited

U.S. PATENT DOCUMENTS

| | | |
|---|---|---|
| 10,458,351 B2 | 10/2019 | Wilder et al. |
| 10,753,459 B2 | 8/2020 | Jacobs et al. |
| 12,091,011 B1* | 9/2024 | Khaja ................... B60W 10/10 |
| 2004/0039512 A1* | 2/2004 | Scholl ..................... B60K 35/00 |
| | | 701/64 |
| 2010/0010710 A1* | 1/2010 | Kopp .................... B60T 8/1764 |
| | | 701/73 |
| 2010/0161188 A1* | 6/2010 | Turski ..................... B60T 8/175 |
| | | 701/67 |
| 2015/0266479 A1* | 9/2015 | Blakeway ....... B60W 30/18027 |
| | | 477/92 |
| 2017/0203760 A1* | 7/2017 | Sowards ............. B60W 10/184 |
| 2020/0122534 A1* | 4/2020 | Glugla ................ B60C 23/0476 |
| 2021/0074090 A1* | 3/2021 | Neumann, Jr. .......... G07C 1/22 |
| 2021/0387624 A1* | 12/2021 | Wilder ............ B60W 30/18027 |
| 2022/0288500 A1 | 9/2022 | Spillman et al. |
| 2024/0181896 A1* | 6/2024 | Zebiak ................... B60L 15/20 |
| 2024/0253633 A1* | 8/2024 | Prucka ............ B60W 30/18027 |
| 2024/0253634 A1* | 8/2024 | Prucka ................ B60W 50/082 |
| 2024/0262359 A1* | 8/2024 | Corallo ................ B60W 10/02 |

\* cited by examiner

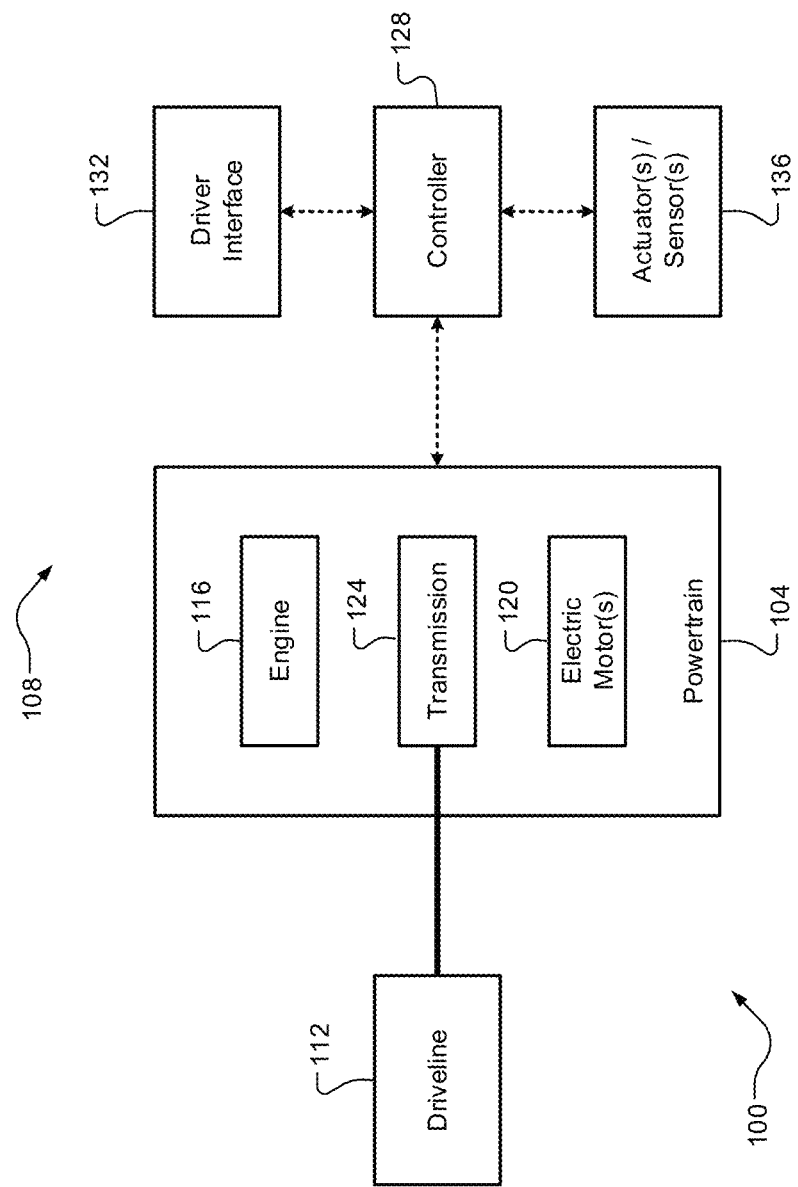

VEHICLE LAUNCH CONTROL SEQUENCING

FIELD

The present application generally relates to vehicle launch control and, more particularly, to vehicle launch control sequencing techniques.

BACKGROUND

Some of today's higher performance vehicles have powertrains that are so powerful that launch control techniques are preferred to prevent wheel slip and to optimize vehicle performance. This is particularly true for drag racing scenarios, such as at a drag racing facility. Conventional launch control requires the driver to perform many different tasks leading up to and during the initial launch. This includes tasks such as initiating a launch mode (e.g., a preconfigured mode for optimized powertrain performance), modulating brake/accelerator pedals up to and at a start line, and modulating the accelerator pedal at and throughout the vehicle launch (e.g., in response to a green light signal). It has been discovered that these conventional systems can be difficult to effectively utilize and perform/execute simultaneously, particularly in the short time frame from pit to starting line and while the driver's adrenaline is high. This can potentially result in poor vehicle launch performance. Accordingly, while such conventional vehicle launch control techniques do work for their intended purpose, there exists an opportunity for improvement in the relevant art.

SUMMARY

According to one example aspect of the invention, a launch control system for a vehicle having a powertrain is presented. In one exemplary implementation, the launch control system comprises a driver interface configured to display information to and input from a driver of the vehicle, the driver interface comprising a brake pedal, an accelerator pedal, and two paddle shifters, and a controller in communication with the driver interface and configured to obtain a desired launch torque curve and a desired launch speed, perform a pre-staging procedure including generating a torque reserve for the powertrain, in response to (i) the brake pedal being fully engaged, (ii) the paddle shifters being a first configuration, and (iii) the accelerator pedal being at wide-open throttle (WOT), after the pre-staging procedure is complete, control vehicle positioning/movement in response to driver manipulation of the brake pedal, perform a staging procedure including (a) increasing the torque reserve, (b) activating a trans brake feature to hold the vehicle stationary, and (c) increasing a speed of the powertrain to the desired launch speed, in response to (i) the paddle shifters in a different second configuration and (ii) fully releasing the brake pedal, and after the staging procedure and in response to the paddle shifters being in a different third configuration, executing a vehicle launch procedure by depleting the torque reserve according to the desired launch torque curve.

In some implementations, the first configuration for the paddle shifters is both paddle shifters being fully engaged/depressed. In some implementations, the second configuration for the paddle shifters is one of the two paddle shifters being released and the other of the two paddle shifters remaining fully engaged/depressed. In some implementations, the third configuration for the paddle shifters is the other of the two paddle shifters being released such that both paddle shifters are released.

In some implementations, the pre-staging procedure is performed by the vehicle in a pit area of a drag race facility in preparation for a drag race. In some implementations, the driver controls movement/position of the vehicle after the pre-staging procedure to move/reposition the vehicle from the pit area to a start line for the drag race. In some implementations, the controller executes the vehicle launch procedure while the accelerator pedal remains at WOT and without accelerator pedal modulation by the driver. In some implementations, the driver interface further comprises a touch display, and wherein the controller is configured to obtain the desired launch torque curve and the desired launch speed as input from the driver via the touch display of the driver interface.

According to another example aspect of the invention, a launch control method for a vehicle having a powertrain is presented. In one exemplary implementation, the launch control method comprises providing a driver interface configured to display information to and input from a driver of the vehicle, the driver interface comprising a brake pedal, an accelerator pedal, and two paddle shifters, and a controller in communication with the driver interface, obtaining, by the controller, a desired launch torque curve and a desired launch speed, performing, by the controller, a pre-staging procedure including generating a torque reserve for the powertrain, in response to (i) the brake pedal being fully engaged, (ii) the paddle shifters being a first configuration, and (iii) the accelerator pedal being at wide-open throttle (WOT), after the pre-staging procedure is complete, controlling, by the controller, vehicle positioning/movement in response to driver manipulation of the brake pedal, performing, by the controller, a staging procedure including (a) increasing the torque reserve, (b) activating a trans brake feature to hold the vehicle stationary, and (c) increasing a speed of the powertrain to the desired launch speed, in response to (i) the paddle shifters in a different second configuration and (ii) fully releasing the brake pedal, and after the staging procedure and in response to the paddle shifters being in a different third configuration, executing, by the controller, a vehicle launch procedure by depleting the torque reserve according to the desired launch torque curve.

In some implementations, the first configuration for the paddle shifters is both paddle shifters being fully engaged/depressed. In some implementations, the second configuration for the paddle shifters is one of the two paddle shifters being released and the other of the two paddle shifters remaining fully engaged/depressed. In some implementations, the third configuration for the paddle shifters is the other of the two paddle shifters being released such that both paddle shifters are released.

In some implementations, the method further comprises performing the pre-staging procedure in a pit area of a drag race facility in preparation for a drag race. In some implementations, the driver controls movement/position of the vehicle after the pre-staging procedure to move/reposition the vehicle from the pit area to a start line for the drag race. In some implementations, the controller executes the vehicle launch procedure while the accelerator pedal remains at WOT and without accelerator pedal modulation by the driver. In some implementations, the driver interface further comprises a touch display, and wherein obtaining the desired launch torque curve and the desired launch speed comprises receiving, as input from the driver via the touch display of the driver interface, the desired launch torque curve and the desired launch speed.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 1 is a functional block diagram of a vehicle having an example launch control system according to the principles of the present application;

DESCRIPTION

Figure 2A:
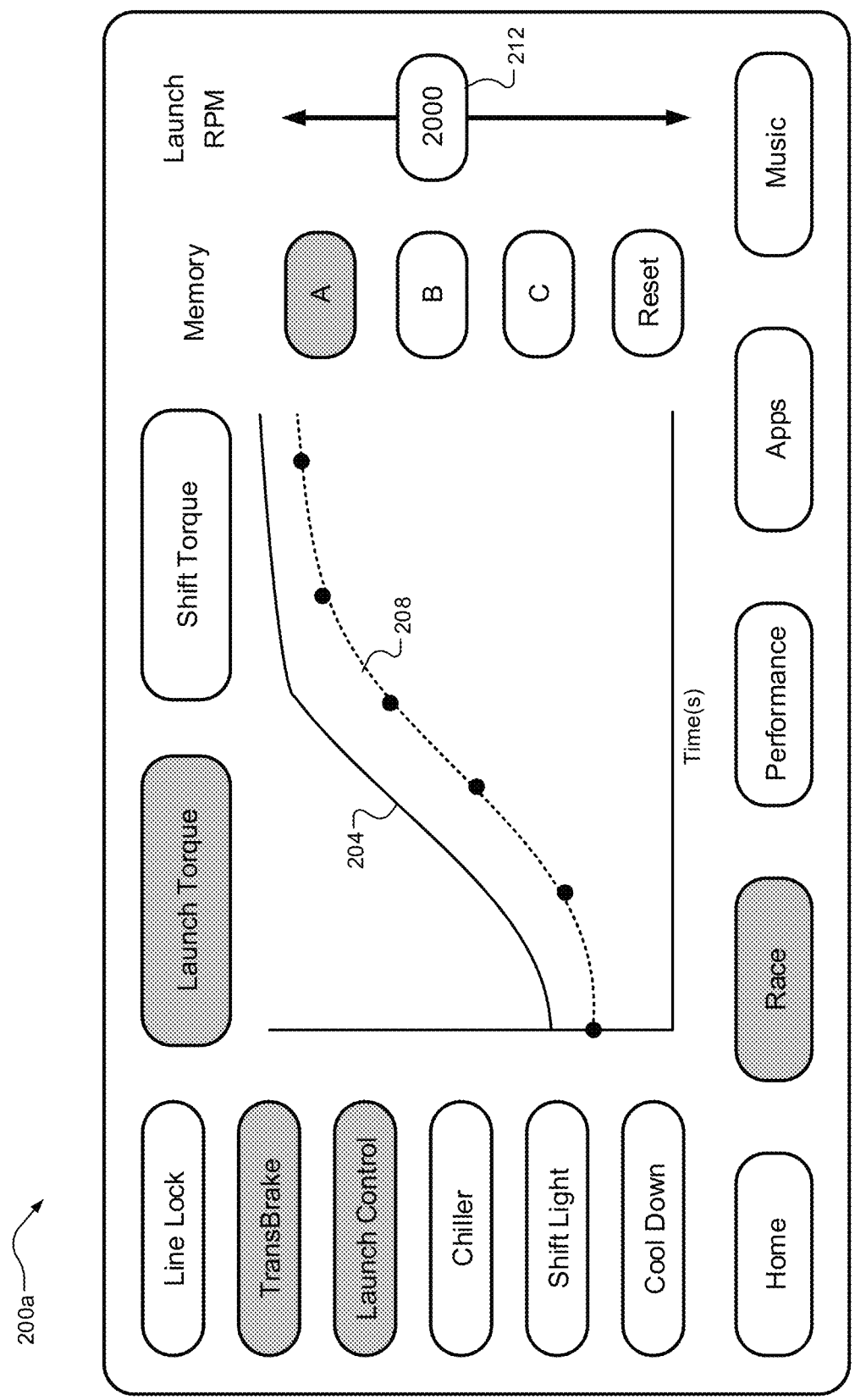
FIGS. 2A-2C are example user interfaces displayed to and interacted with by a driver of the vehicle to input and customize launch control parameters according to the principles of the present disclosure.

As previously discussed, the main driver feedback for conventional launch control systems is that they are difficult to properly utilize, particularly in the short time frame from pit to starting line and while the driver's adrenaline is high. This often results in poor vehicle launch performance. As a result, the present application is directed to techniques that perform an improved launch procedure including pre-staging and staging periods and corresponding driver interfacing for the same. The driver initially provides inputs to generate a launch torque curve and a launch speed. The launch torque curve, for example can be adjusted by the driver via a plurality of torque vs. time points relative to a maximum available torque curve. Once the driver's inputs have been provided and finalized, the driver then initiates a pre-stage procedure by fully depressing the brake pedal, pulling and holding both paddle shifters, and fully depressing the accelerator pedal to wide-open throttle (WOT). This completes the pre-staging, with the engine speed being held at a predetermined idle speed (e.g., 1500 revolutions per minute, or RPM). The driver is then able to control movement of the vehicle ("vehicle creep") via the brake pedal, such as to move the vehicle from a pit area to the race area (e.g., the drag strip).

Once ready, the driver then initiates a staging procedure by releasing one of the paddle shifters, which engages a trans brake feature to hold the vehicle stationary and the engine speed transitions to the launch speed (e.g., 2500 RPM). The driver then releases the brake pedal, which completes the staging procedure. The driver is then ready to execute the vehicle launch. When desired (e.g., when the light changes to green), the driver releases the other paddle shifter, which initiates the launch procedure. The trans brake releases, and the engine torque then follows the launch torque curve with shift recovery and torque reserve release as initially specified by the driver by their inputs via the driver interfaces. The launch procedure completes after the torque curve is completed/delivered, and the driver then resumes normal control/operation of the vehicle (e.g., at the completion of the run). These techniques, including examples of the user/driver interfaces, are illustrated herein and will now be discussed in greater detail.

Referring now to FIG. 1, a functional block diagram of a vehicle 100 having a powertrain 104 and a launch control system 108 according to some implementations of the present disclosure is illustrated. The powertrain 104 comprises a torque generating system configured to generate drive torque that is transferred to a driveline 112 of the vehicle 100. The torque generating system includes an internal combustion engine 116, one or more electric motors 120, or some combination thereof (e.g., a hybrid configuration). The drive torque is transferred to the driveline 112 via a transmission 124, such as an automatic transmission. The transmission 124 is also configured to provide a "trans brake" feature, such that the transmission 124 locks up its output shaft ad prevents the delivery of drive torque being input to the transmission 124. A controller 128 controls operation of the powertrain 104, for example, such that the powertrain 104 generates an amount of drive torque to satisfy a driver torque request provided via a driver interface 132 (e.g., an accelerator pedal).

The controller 128 also receives information from and/or controls other sensors/actuator(s) 136 of the vehicle 100. The driver interface 132 could further include other components, such as an infotainment unit comprising a touch display for displaying information to and receiving input from the driver. In one exemplary implementation, the controller 128 and the driver interface 132 are in communication to (i) determine and display a maximum available torque curve for the powertrain 104 based on current conditions (e.g., ambient conditions, such as temperatures), (ii) receive, from the driver, a desired launch speed for the powertrain 104, (iii) receive, from the driver, a desired torque curve for the powertrain 104, wherein the desired torque curve changes in response to changes to the desired launch speed, and (iv) generate, in response to a command via the driver interface, a final desired torque curve for the powertrain 104. This final desired torque curve is then utilizable for vehicle launch procedures.

Figure 2B:
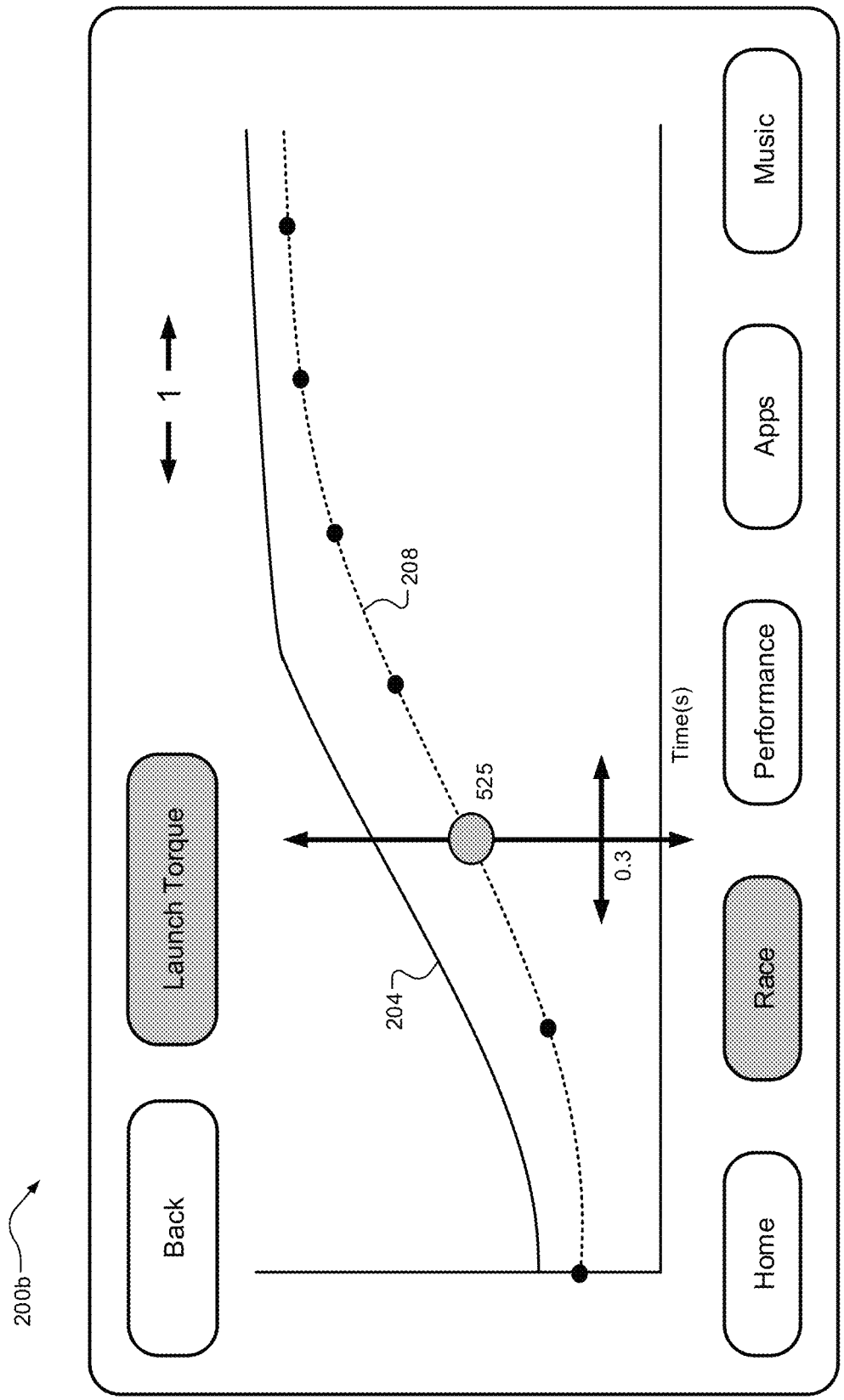
Figure 2C:
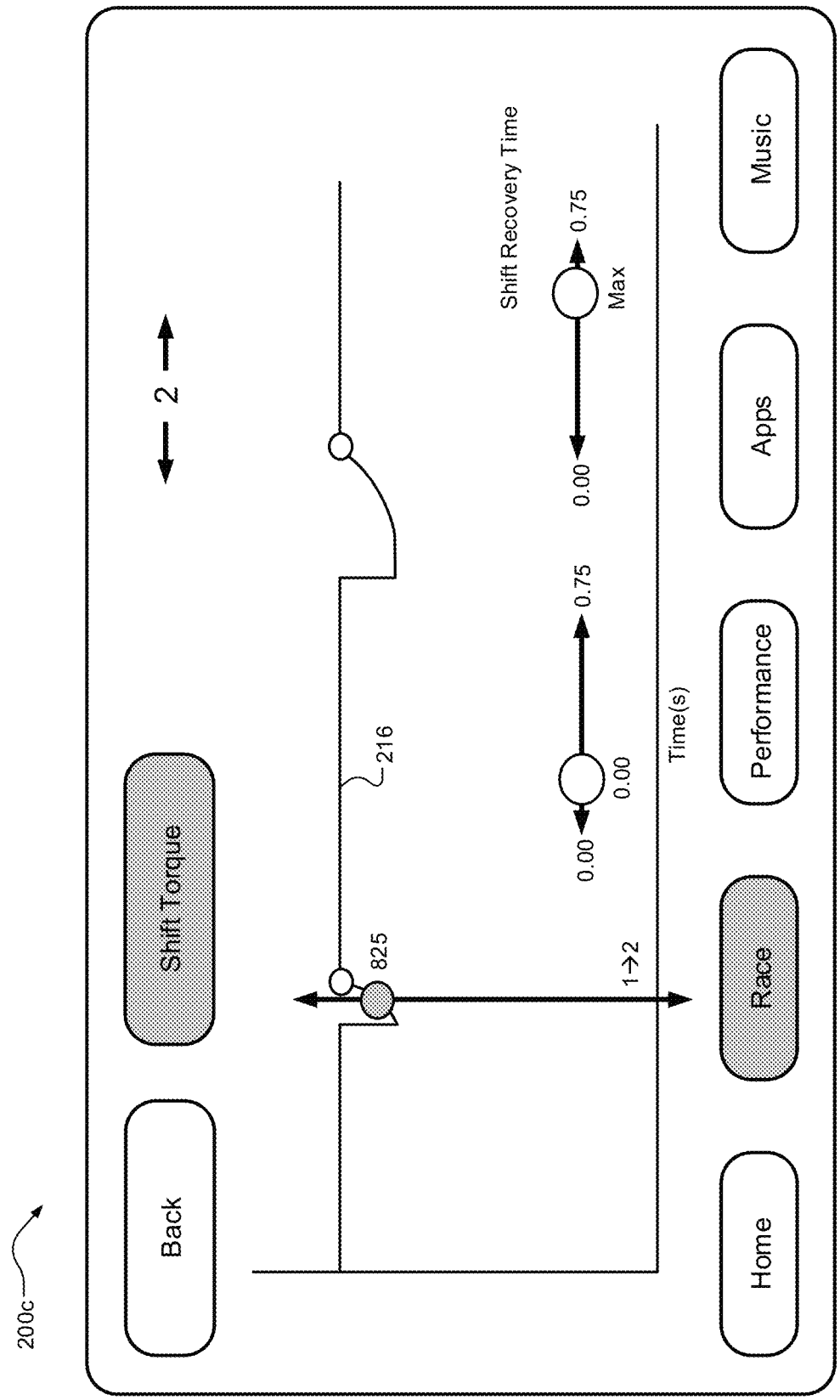

Referring now to FIGS. 2A-2C, example user interfaces 200a-200c displayable by the driver interface 132 and interactable with by the driver of the vehicle 100 according to some implementations of the present application are illustrated. It will be appreciated that these are merely example user/driver interfaces and various different looking/configured interfaces could be utilized while still providing for the same described functionality. In a first driver interface 200a of FIG. 2A, a bottom set of icons displays "Home," "Race," "Performance," "Apps," and "Music" and the icon for "Race" options is selected. A left set of icons displays "Line Lock," "Trans Brake," "Launch Control," "Chiller," "Shift Light," and "Cool Down." Each of these is various features relative to high performance vehicle launching and are relatively self-explanatory and many of these buttons are also merely for example purposes and could be optional. As shown, the "Trans Brake" features is selected or enabled and the driver is configuring within the "Launch Control" options.

A maximum available torque curve 204 for the powertrain 104 is determined (e.g., given ambient conditions, such as temperatures and road condition/slickness) and displayed. A driver-customized launch torque curve 208 is also illustrated relative to the maximum available torque curve 204 and is defined by a plurality of points. While six points are shown, it will be appreciated that any suitable number of points could be utilized to provide enough information for a usable launch torque curve (e.g., 13 total points). Predetermined (saved) or preset/preconfigured launch torque curves for selection by the driver (A-C) are also programmable and retrievable and the launch speed 212 for the trans brake feature is also driver-selectable (e.g., set at 2000 RPM as shown). This vehicle launch speed could be (and likely will be) different (e.g., higher) than a normal idle speed of the powertrain 104. For example, an idle speed of the engine 116 could be approximately 1500 RPM.

In a second driver interface 200b of FIG. 2B, further details and driver configuration of the launch torque curve is shown. The driver, for example, could be able to vary the amount of torque (e.g., 525 pound-feet, or lb-ft.) are given times (e.g., 0.3 seconds, or s). Arrows could be utilized and interacted with by the driver to alter either of these values and the driver is able to reference the maximum available drive torque curve 204 during this process. The previously selected trans brake launch speed 212 (e.g., 2000 RPM) could also vary one or both of the maximum available launch torque curve 204 and the driver-customizable launch torque curve 208.

In addition to customizing the torque curve for vehicle launch, the driver is able to customize shift torque and other parameters by selecting the corresponding upper icon of the driver interface 200a in FIG. 2A. As shown in a third driver interface 200c of FIG. 2C, the shift torque icon has been selected, which displays torque drops/dips and shift recovery times for two different consecutive shift operations: $1^{st}$ gear to $2^{nd}$ gear and $2^{nd}$ gear to $3^{rd}$ gear. The driver is able to adjust the shift recovery times for each shift, such as between minimum (e.g., 0.00 s) and maximum (e.g., 0.75 s) values. In some implementations, the driver is also able to adjust the torque drop/dip for each shift operation as shown (e.g., 825 lb-ft. for the $1^{st}$ to $2^{nd}$ gear shift with a 0.00 s recovery time). By customizing these shift times/parameters, the driver is able to more fully customize the drive torque curve and potentially further improve vehicle performance.

Figure 3A:
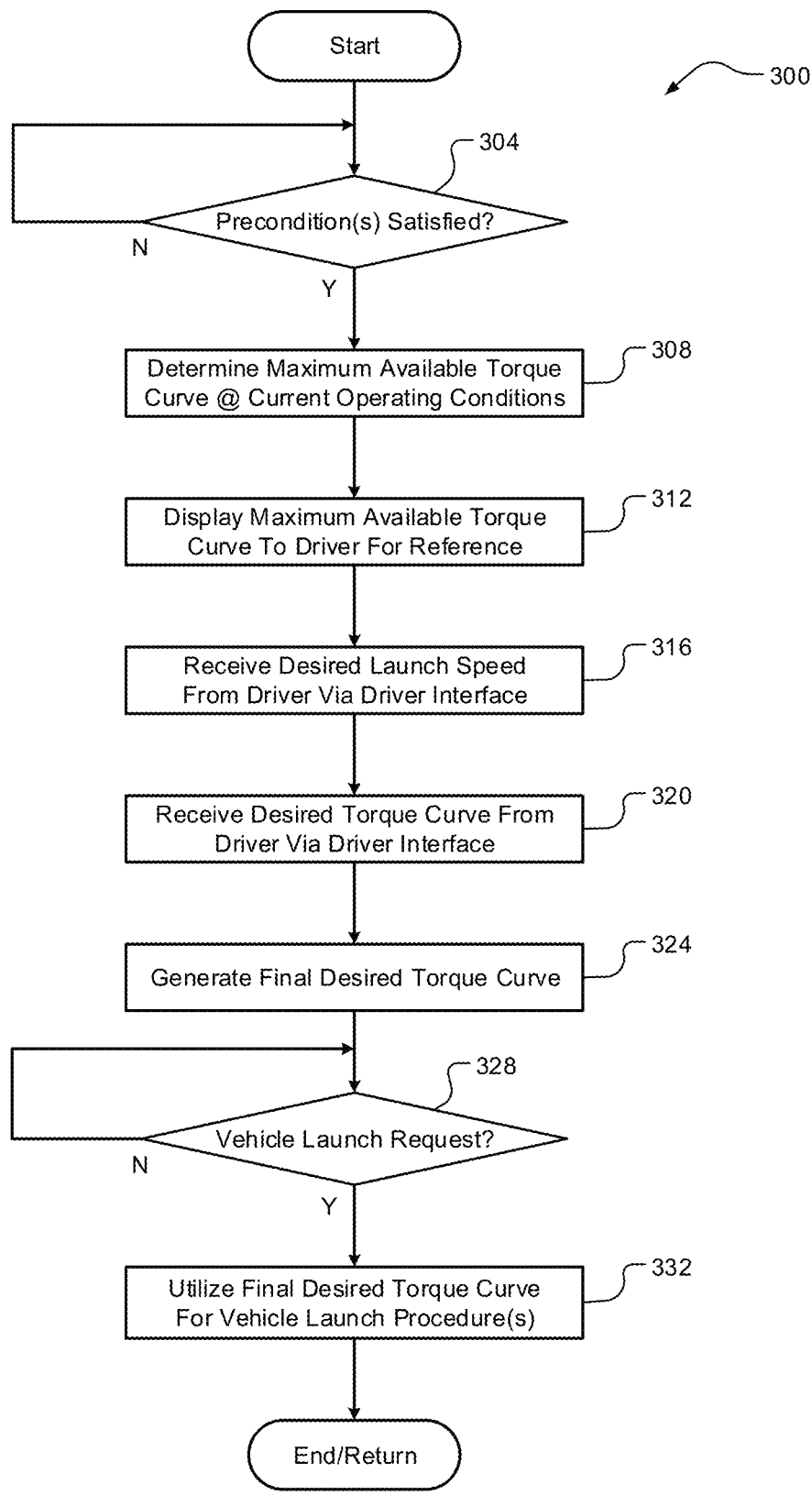
FIGS. 3A-3B are flow diagrams of example launch control methods for a vehicle according to the principles of the present application.

Referring now to FIG. 3A, a flowchart of a first vehicle launch control method 300 according to some implementations of the present application is illustrated. This method 300 represents the preconfiguring and customizing of the launch torque curve by the driver via the driver interface 132 and its subsequent usage by the controller 128 to perform a launch operation. At 304, the controller 128 determines whether a set of precondition(s) are satisfied. This could include, for example only, the powertrain 104 being activated (e.g., the engine 116 running) and the transmission 124 being in park. This could be, for example, while the driver and the vehicle 100 are in a pit station at a drag race facility. When the precondition(s) are satisfied, the method 300 proceeds to 308. Otherwise, the method 300 ends or returns to 304. At 308 and 312, the controller 128 determines and then displays, via the driver interface 132, the maximum available torque curve for the powertrain 104 based on current conditions.

At 316, the controller 128 receives, from the driver via the driver interface 132, the desired launch speed for the powertrain 132 (e.g., for the trans brake feature). At 320, the controller 128 receives, from the driver via the driver interface 132, the desired torque curve for the powertrain 104. As previously discussed, the desired torque curve could change in response to changes to the desired launch speed. It will be appreciated that this step 320 could include the driver input of shift recovery curve(s), but it will also be appreciated that this could be a separate step prior to 320. At 324, the controller 128 generates, in response to a command via the driver interface 132 (e.g., "select" or "finalize"), a final desired torque curve for the powertrain 104. At 328, the controller 128 determines whether a vehicle launch procedure is requested (e.g., based on other inputs, such as WOT accelerator pedal, paddle shifter engagement/release, and brake pedal release). When true, the method 300 proceeds to 332. Otherwise, the method 300 returns to 328 and waits for the vehicle launch request or the method 300 could end or timeout. At 332, the controller 128 performs launch control of the vehicle 100 by controlling the powertrain 104 according to the final desired torque curve. After delivery of the final desired torque curve, the driver regains normal control/operation of the vehicle 100 and the powertrain 104. The method 300 then ends or returns to 304 for one or more additional cycles.

Figure 3B:
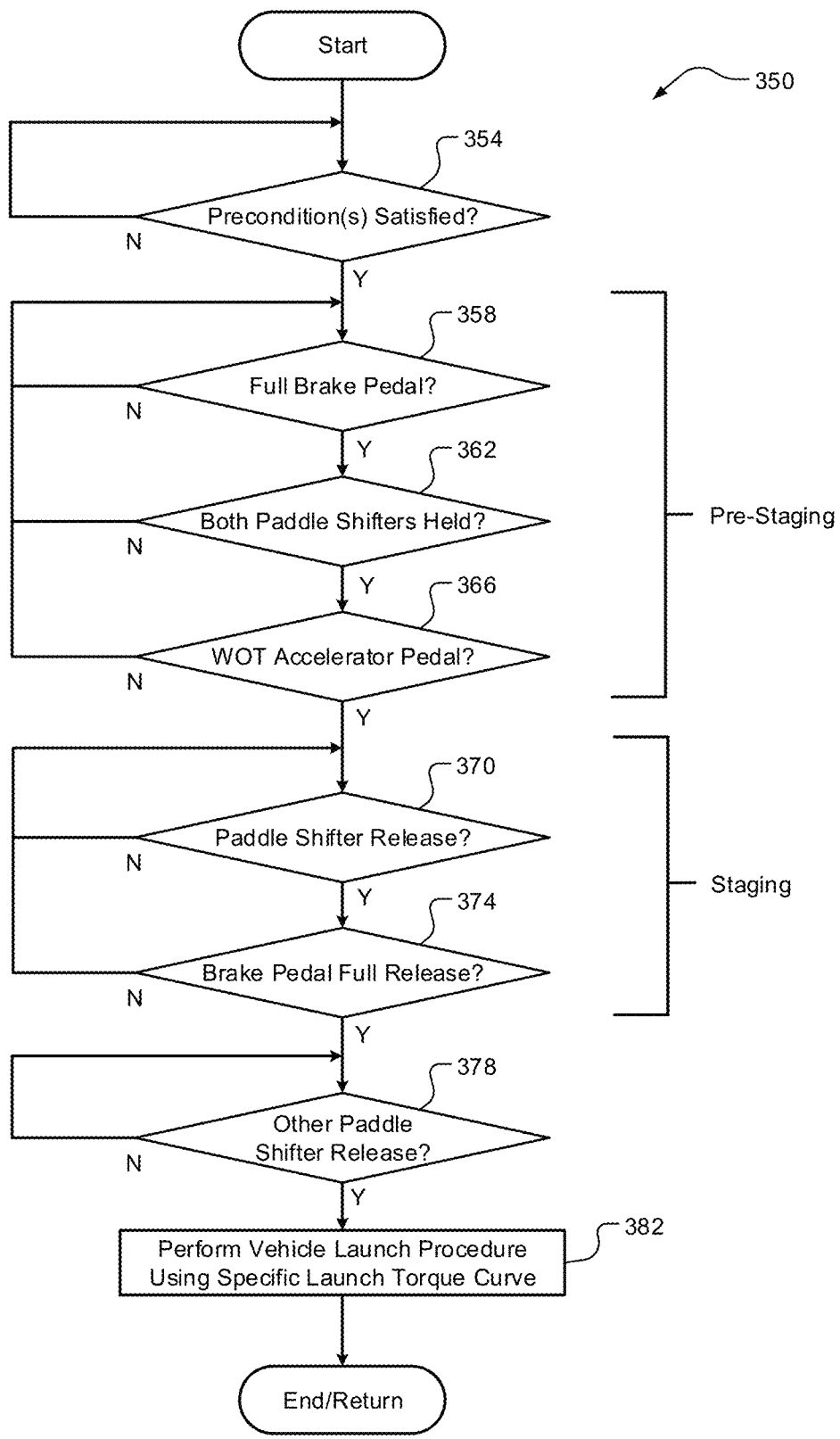

Referring now to FIG. 3B, a flowchart of a second vehicle launch control method 350 according to some implementations of the present application is illustrated. This method 350 represents the pre-staging and staging procedures performed by the driver via the driver interface 132 in order to execute the vehicle launch procedure. via the driver interface 132. This method 350 could also utilize the driver-customized launch torque curve (i.e., the final desired launch torque curve) generated in the previously-described method 300 and shown in FIG. 3A. At 354, the controller 128 determines whether a set of precondition(s) are satisfied. This could include, for example only, the powertrain 104 being activated (e.g., the engine 116 running), the vehicle 100 being at a suitable drag race facility, and/or no errors/malfunctions being present. When true, the method 350 proceeds to 358. Otherwise, the method 350 ends or returns to 354. At 358, the controller 128 initiates a pre-staging procedure, including the driver fully depressing the brake pedal, pulling and holding both paddle shifters at 362, and fully depressing the accelerator pedal (WOT) at 366 when prompted via the driver interface 132.

This generates a pre-stage torque reserve and completes the pre-staging procedure and the driver is able to control vehicle positioning/creep via the brake pedal to move to the start line. At 370, the controller 128 initiates a staging procedure, including releasing one of the paddle shifters to engage the trans brake feature, causing the powertrain 104 (engine 116) speed to increase to the desired launch speed, and fully releasing the brake pedal at 374 (with the trans brake holding the vehicle 100 stationary). This generates a staged torque reserve and completes the staging procedure. At 378, the controller 128 waits for the driver to release the other (engaged) paddle shifter (e.g., in response to a green light or "go" signal). When false, the method 350 returns to 378 and continues to wait, until a potential timeout is reached after which the method 350 could end. When true, the method 350 proceeds to 382 where the vehicle launch procedure is executed using the driver-customized (or pre-selected) launch torque curve. After torque delivery, the driver regains normal control/operation of the vehicle 100 and the powertrain 104. The method 300 then ends or returns to 304 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A launch control system for a vehicle having a powertrain, the launch control system comprising:
   a driver interface configured to display information to and receive input from a driver of the vehicle, the driver interface comprising a brake pedal, an accelerator pedal, and two paddle shifters; and
   a controller in communication with the driver interface and configured to:
      obtain a desired launch torque curve and a desired launch speed;
      perform a pre-staging procedure including generating a torque reserve for the powertrain, in response to (i) the brake pedal being fully engaged, (ii) the paddle shifters being a first configuration, and (iii) the accelerator pedal being at wide-open throttle (WOT), wherein the pre-staging procedure is performed by the vehicle in a pit area of a drag race facility in preparation for a drag race;
      after the pre-staging procedure is complete, control vehicle positioning/movement in response to driver manipulation of the brake pedal;
      perform a staging procedure including (a) increasing the torque reserve, (b) activating a trans brake feature to hold the vehicle stationary, and (c) increasing a speed of the powertrain to the desired launch speed, in response to (i) the paddle shifters in a different second configuration and (ii) fully releasing the brake pedal; and
      after the staging procedure and in response to the paddle shifters being in a different third configuration, executing a vehicle launch procedure by depleting the torque reserve according to the desired launch torque curve.

2. The launch control system of claim 1, wherein the first configuration for the paddle shifters is both paddle shifters being fully engaged/depressed.

3. The launch control system of claim 2, wherein the second configuration for the paddle shifters is one of the two paddle shifters being released and the other of the two paddle shifters remaining fully engaged/depressed.

4. The launch control system of claim 3, wherein the third configuration for the paddle shifters is the other of the two paddle shifters being released such that both paddle shifters are released.

5. The launch control system of claim 1, wherein the driver controls movement/position of the vehicle after the pre-staging procedure to move/reposition the vehicle from the pit area to a start line for the drag race.

6. The launch control system of claim 1, wherein the controller executes the vehicle launch procedure while the accelerator pedal remains at WOT and without accelerator pedal modulation by the driver.

7. The launch control system of claim 1, wherein the driver interface further comprises a touch display, and wherein the controller is configured to obtain the desired launch torque curve and the desired launch speed as input from the driver via the touch display of the driver interface.

8. A launch control method for a vehicle having a powertrain, the launch control method comprising:
   providing a driver interface configured to display information to and receive input from a driver of the vehicle, the driver interface comprising a brake pedal, an accelerator pedal, and two paddle shifters, and a controller in communication with the driver interface;
   obtaining, by the controller, a desired launch torque curve and a desired launch speed;
   performing, by the controller, a pre-staging procedure including generating a torque reserve for the powertrain, in response to (i) the brake pedal being fully engaged, (ii) the paddle shifters being a first configuration, and (iii) the accelerator pedal being at wide-open throttle (WOT), wherein the pre-staging procedure is performed in a pit area of a drag race facility in preparation for a drag race;
   after the pre-staging procedure is complete, controlling, by the controller, vehicle positioning/movement in response to driver manipulation of the brake pedal;
   performing, by the controller, a staging procedure including (a) increasing the torque reserve, (b) activating a trans brake feature to hold the vehicle stationary, and (c) increasing a speed of the powertrain to the desired launch speed, in response to (i) the paddle shifters in a different second configuration and (ii) fully releasing the brake pedal; and
   after the staging procedure and in response to the paddle shifters being in a different third configuration, executing, by the controller, a vehicle launch procedure by depleting the torque reserve according to the desired launch torque curve.

9. The launch control method of claim 8, wherein the first configuration for the paddle shifters is both paddle shifters being fully engaged/depressed.

10. The launch control method of claim 9, wherein the second configuration for the paddle shifters is one of the two paddle shifters being released and the other of the two paddle shifters remaining fully engaged/depressed.

11. The launch control method of claim 10, wherein the third configuration for the paddle shifters is the other of the two paddle shifters being released such that both paddle shifters are released.

12. The launch control method of claim 8, wherein the driver controls movement/position of the vehicle after the pre-staging procedure to move/reposition the vehicle from the pit area to a start line for the drag race.

13. The launch control method of claim 8, wherein the controller executes the vehicle launch procedure while the accelerator pedal remains at WOT and without accelerator pedal modulation by the driver.

14. The launch control method of claim 8, wherein the driver interface further comprises a touch display, and wherein obtaining the desired launch torque curve and the desired launch speed comprises receiving, as input from the driver via the touch display of the driver interface, the desired launch torque curve and the desired launch speed.

* * * * *